United States Patent Office 3,107,260
Patented Oct. 15, 1963

3,107,260
TRIAMINOPROPANE HEXA-ACETIC ACID AND METAL CHELATES THEREOF
Martin Knell, Ossining, N.Y., assignor to Geigy Chemical Corporation, Greenburgh, N.Y., a corporation of Delaware
No Drawing. Filed Nov. 29, 1960, Ser. No. 72,309
9 Claims. (Cl. 260—439)

This invention relates to a novel polyaminopolycarboxylic acid and its metal chelates and particularly to a triaminohexaacetic acid which exhibits sequestering activity and is useful as a chelating agent. The invention also pertains to the new procedure used in the preparation of the subject compounds.

It is known that organic nitrogen compounds with more than one acetic acid radical attached to a basic nitrogen atom have the property of preventing the formation of precipitates of the alkaline earth and heavy metal salts from solutions or of redissolving precipitates of these metals which have already formed.

Especially useful among the group of such synthetic polyaminopolycarboxylic acids are ethylenediaminetetraacetic acid (EDTA) and diethylenetriaminopentaacetic acid (DTPA).

The commercial applications of these acids are numerous and varied. In industry, they are used in the manufacture of synthetic rubber, of soaps and synthetic detergents, in textile and food processing, etc. In agriculture, their iron chelates are useful for the treatment of iron deficiencies in certain economic crops. In medicine, they are effective in conditions of poisoning with radioactive and other toxic metals. Numerous other applications of these acids and their metal chelates have been described in the scientific and commercial literature.

The unexpected and surprising finding has now been made that triaminopropanehexaacetic acid possesses complex-forming or chelating properties in a highly favorable degree, surpassing even those of DTPA.

The new chelating agent which may be designated more specifically as 1,2,3-triaminopropane-N,N,N',N',N'',N''-hexaacetic acid corresponds to the formula

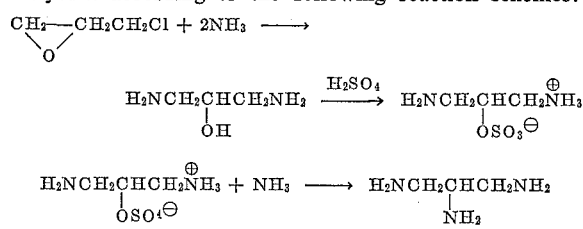

This new triaminohexaacetic acid is obtained from 1,2,3-triaminopropane of the formula

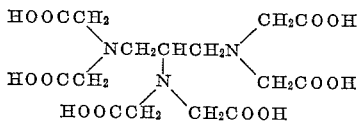

by treatment with at least six molecular proportions of reactive acetic acid derivatives. These derivatives may contain instead of the free carboxyl group, modified carboxyl groups which are finally converted to the free groups. As examples of substituted acetic acids reactive at the α-position may be mentioned the monohalogen acetic acids, such as monochloracetic acid and monobromacetic acid and their alkali or other metal salts. By compounds with modified carboxyl groups are to be understood the esters, amides and nitriles of these monohalogen acetic acids. The conversion of the modified carboxyl groups to the free carboxyl groups is brought about by acid or, preferably, alkaline hydrolysis. Other practicable methods of carboxymethylation involve the use of formaldehyde cyanohydrin or mixtures of alkali cyanides and formaldehyde or hydrogen cyanide and formaldehyde or hydrogen cyanide and formaldehyde. See U.S. Pat. Nos. 2,387,735 and 2,845,457.

It has surprisingly been found, however, that a triaminopropanehexaacetic acid product of high yield and purity from 1,2,3-triaminopropane and an α-monohalogen acetic acid, such as chloroacetic acid, can be obtained only if the pH of the reaction mixture is critically controlled at between 11 and 12 throughout the addition of sodium hydroxide to the reaction mixture. A more specific and preferable pH range is between 11.5 to 11.7.

The 1,2,3-triaminopropane serving as starting material for the manufacture of the new compound is reported in the literature but may also be obtained from epichlorohydrin according to the following reaction schemes:

$$CH_2\!-\!CH_2CH_2Cl + 2NH_3 \longrightarrow$$
$$\diagdown O \diagup$$

$$H_2NCH_2CHCH_2NH_2 \xrightarrow{H_2SO_4} H_2NCH_2CHCH_2\overset{\oplus}{NH_3}$$
$$\quad\quad\quad\;\;|\quad\quad\quad\quad\quad\quad\quad\quad\quad\quad\quad\quad|$$
$$\quad\quad\quad\;OH\quad\quad\quad\quad\quad\quad\quad\quad\quad\quad OSO_3^{\ominus}$$

$$H_2NCH_2CHCH_2\overset{\oplus}{NH_3} + NH_3 \longrightarrow H_2NCH_2CHCH_2NH_2$$
$$\quad\quad\quad|\quad\quad\quad\quad\quad\quad\quad\quad\quad\quad\quad\quad\quad\quad|$$
$$\quad\;\;OSO^{\ominus}\quad\quad\quad\quad\quad\quad\quad\quad\quad\quad\quad NH_2$$

The new hexaacetic acid compound is a white powder, the alkali salts of which are exceedingly soluble in water. As stated above, it has utility as a chelating agent. Its usefulness as a chelating agent is manifold. For instance, it has been found that the above triaminopropanehexaacetic acid chelates iron better than DTPA. It is thus exceedingly effective as a kier boiling agent for the removal of iron stains from cotton goods. It also surpasses DTPA considerably in preventing precipitation of iron hydroxide in neutral brine, such as is encountered in oil well flooding operations.

When complexed with iron to form an iron chelate, it has application as a hematinic to supply iron to the animal organism in order to increase the hemoglobin of the blood. Thus complexed, it may also be used as remedial in conditions known as iron chlorosis in certain economic crops.

This compound, which is relatively non-toxic, has also been found effective in its free acid form or as calcium complex or chelate for the removal from the animal organism of radioactive metals, such as Pu, Y, Sr; and toxic quantities of heavy metals, such as Cu, Fe, Pb, rare earths, etc. Thus, it is useful in conditions of metal poisoning. Further, it has been demonstrated that the subject compound is effective as a bacteriostat against *Staphylococcus aureus* and *Brevibacterium ammonogenes*.

More particularly, it has been found that 1,2,3-triaminopropanehexaacetic acid is effective as a hydrogen peroxide stabilizer in the presence of copper ions and itself is stable in the presence of hydrogen peroxide. In these respects, it also surpasses DTPA surprisingly and unexpectedly.

HYDROGEN PEROXIDE STABILIZER IN THE PRESENCE OF COPPER IONS

Two concentrations of the subject compound and DTPA as the sodium salts were tested in the presence of copper ions. The aqueous mixture containing 1% of 30% hydrogen peroxide, 1% sodium silicate and 0.25 p.p.m. of copper as copper sulfate and a suitable quantity of chelating agent was heated to reflux and aliquots taken for analysis at regular intervals. Data are recorded in Table I.

TABLE I

[0.727 mol. of subject compound 1.25 p.p.m.: 1 mol. Cu++ 0.25 p.p.m.]

|  | Titration (ml. 0.1 N KMnO$_4$) | Percent H$_2$O$_2$ |
|---|---|---|
| Initial | 14.94 | 0.264 |
| 15 min | 5.38 | 0.095 |
| 30 min | 0.80 | 0.014 |

[0.808 mol. of DTPA 1.25 p.p.m.: 1 mol. Cu++ 0.25 p.p.m.]

|  |  |  |
|---|---|---|
| Initial | 16.10 | 0.284 |
| 15 min | 3.20 | 0.057 |
| 30 min | 0.03 | 0.001 |

STABILITY IN THE PRESENCE OF HYDROGEN PEROXIDE

The subject compound and DTPA as the sodium salts at a concentration of 0.01 N in the presence of a suitable quantity of hydrogen peroxide were heated to reflux in five minutes and refluxed for 15 minutes after which they were titrated with zinc chloride in a pH 10.5-ammonia buffer using Eriochrome Black T as indicator (Schwarzenbach procedure). Data are reported in Table II.

TABLE II
SUBJECT COMPOUND

| Concentration of H$_2$O$_2$ | Percent Breakdown | |
|---|---|---|
|  | pH 7.5 | pH 10.1 |
| 0.2% | 10.77 | 6.72 |
| 0.4% | 20.5 | 18.86 |

DTPA

| Concentration of H$_2$O$_2$ | pH 7.9 | pH 9.8 |
|---|---|---|
| 0.2% | 19.23 | 40.59 |
| 0.4% | 36.34 | 75.85 |

The following examples to which, however, the invention is not restricted, give details of the preparation of the new compound and its chelates.

Example I (a) PREPARATION OF THE HEXA SODIUM SALT

Chloroacetic acid (73.8 g. or 0.78 mole) in 35 ml. of water was neutralized with 62.4 g. of 50% sodium hydroxide (0.78 mole) to pH 12.8 with cooling in an ice bath. 1,2,3-triaminopropane (8.9 g. or 0.1 mole) was mixed into the paste (the pH dropped to 11) and the mixture stirred while an additional 62.4 g. of 50% sodium hydroxide (0.78 mole) was added dropwise over a period of 9 hours. The electrodes of a pH meter were inserted into the reaction mixture and the pH throughout most of the addition was controlled at 11.55 to 11.70. The temperature of the reaction mixture was maintained at 45–55° except during the last hour of the addition when the temperature was raised to 60° C. The reaction mixture was stirred at 60° for 1½ hours after the addition was complete and water was added periodically to maintain the volume. The mixture was then allowed to cool to 40° C. and 105 ml. of water was added to dissolve the precipitated sodium chloride. The yield of the hexa sodium salt of 1,2,3-triaminopropanehexaacetic acid, as determined by the calcium chelating activity of the solution, was 95%.

The solution of the sodium salt of the chelating agent can be used directly for many applications where the presence of sodium chloride and other impurities does not interfere. For other applications it is desirable to use the chelating agent in its free acid form.

(b) ISOLATION OF THE FREE ACID

The stirred solution of the hexa sodium salt of 1,2,3-triaminopropanehexaacetic acid (313 g., 16.9% active) was neutralized by the dropwise addition of 64 ml. of concentrated hydrochloric acid (theoretical amount) at 30–40° C. to pH 1.5. Water was added to dissolve sodium chloride and the solution was seeded with crystals of 1,2,3-triaminopropanehexaacetic acid, allowed to stir for several hours and to stand at room temperature several days while the product precipitated slowly. The white, crystalline 1,2,3-triaminopropanehexaacetic acid was filtered and washed and triturated with water until the product was essentially free of chloride ion. It was dried in vacuo over phosphorus pentoxide at 45° C. to constant weight. A first crop weighing 21 g. (49% yield) was obtained, M.P. 228–229° C. (decomp.).

Analysis for $C_{15}H_{23}O_{12}N_3$: Calcd.: N.E., 109.3; N, 9.61. Found: N.E. 112.0; N, 9.21 (Kjedahl), 9.19 (Dumas).

A slightly less pure second crop was obtained from the mother liquor.

Example II

PREPARATION OF THE MAGNESIUM CHELATE

Magnesium oxide (0.18 g.) and 1.92 g. of 1,2,3-triaminopropanehexaacetic acid were added to a 100 ml.-beaker with 25 ml. of water. The reaction mixture was stirred with a magnetic stirrer while the pH was continuously measured by a Beckman pH meter. The initial pH was 3.74. The reaction mixture was then heated and 14.2 ml. of 1.0 N sodium hydroxide were added to bring the pH to 7.0. After evaporation of the water, the compound was dried in an oven at 50° C.

Example III

PREPARATION OF THE CALCIUM CHELATE

The calcium chelate was prepared by reacting 1.00 g. of calcium carbonate with 4.37 g. of 1,2,3-triaminopropanehexaacetic acid in 10 ml. of water. After the calcium carbonate had dissolved, the solution was neutralized with 1.60 g. of sodium hydroxide. The sodium salt of the calcium chelate was obtained as a white powder by evaporation of the solution to dryness under reduced pressure. In place of calcium carbonate other sources of calcium can be used, such as calcium oxide. Calcium chloride, calcium nitrate, etc. can also be used with appropriate quantities of sodium hydroxide.

Example IV

PREPARATION OF IRON CHELATES

The ferric chelate was prepared by the addition of 2.70 g. of ferric chloride hexahydrate to a solution of 4.37 g. of 1,2,3-triaminopropanehexaacetic acid in 10 ml. of water. 2.40 g. of sodium hydroxide were used to adjust the solution to neutrality. A dry powder can be obtained by evaporation in vacuo. Other iron salts, such as ferric nitrate, ferric sulfate, etc. can be used in place of ferric chloride.

Freshly precipitated iron hydroxide is used to form the iron chelate when it is desired to have a salt free product.

The ferrous chelate can be prepared by using ferrous sulfate. In this preparation, an oxygen-free atmosphere must be used to prevent oxidation to the ferric chelate.

Water-soluble chelate complexes of the subject compounds, in addition to magnesium, calcium and iron mentioned above, may be formed with other polyvalent metals, namely, the divalent or higher than divalent metals. Thus, embraced among these chelate complexes of these sequestering agents are those of divalent metals such as the alkaline earth metals as barium and strontium and the iron group metals as nickel and cobalt, and others such as copper, zinc and manganese. The chelate complexes of higher than divalent metals are not only those with metals such as cobalt and manganese and others like them that also exist in the divalent state, but also those with metals that are only trivalent such as aluminum, as well as those of metals of any other valence. It is possible to have the chelate complex of any of the metals so long as it is polyvalent. The chelate complexes with the various metals referred to above are water-soluble.

What is claimed is:

1. A member of the class consisting of a triaminopropanehexaacetic acid compound of the formula

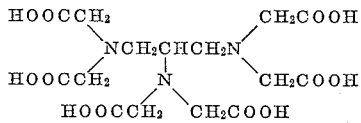

its water-soluble salts with monovalent cations and its water-soluble chelates with polyvalent metals.

2. Aqueous solutions of the members of the class defined in claim 1.

3. 1,2,3 - Triaminopropane - N,N,N',N',N'',N''-hexaacetic acid.

4. A metal chelate of 1,2,3-triaminopropane-N,N,N', N',N'',N''-hexaacetic acid with a polyvalent metal.

5. The magnesium chelate of 1,2,3-triaminopropane-N,N,N',N',N'',N''-hexaacetic acid.

6. An iron chelate of 1,2,3-triaminopropane-N,N,N', N',N'',N''-hexaacetic acid.

7. The ferric chelate of 1,2,3-triaminopropane-N,N, N',N',N'',N''-hexaacetic acid.

8. The ferrous chelate of 1,2,3-triaminopropane-N,N, N',N',N'',N''-hexaacetic acid.

9. The calcium chelate of 1,2,3-triaminopropane-N,N, N',N',N'',N''-hexaacetic acid.

References Cited in the file of this patent

UNITED STATES PATENTS

| | | |
|---|---|---|
| 2,387,735 | Bersworth | Oct. 30, 1945 |
| 2,407,645 | Bersworth | Sept. 17, 1946 |
| 2,816,060 | Carter | Dec. 10, 1957 |